Reissued Apr. 21, 1936

Re. 19,933

UNITED STATES PATENT OFFICE 19,933

CAKE PROCESS AND PRODUCT

Albert K. Epstein, Chicago, Ill.

No Drawing. Original No. 1,964,940, dated July 3, 1934, Serial No. 471,089, July 26, 1930. Application for reissue August 1, 1935, Serial No. 34,225

11 Claims. (Cl. 99—92)

My invention relates to an improved cake product and method of making the same.

It is a commonly known fact that cake and cake like bakery products have a tendency to become stale in a relatively short length of time after they are baked. This tendency is so pronounced that it is a series disadvantage to the baker and it has accordingly been given considerable study for the purpose of learning the reason for the cake becoming stale so quickly, and the development of a suitable method for preventing the effect. Heretofore, no satisfactory solution has been offered. It is assumed from certain empirical facts which have been established that the quick staling of the cake is due to a reversion of the starch, the moisture in the cake being changed from a colloidal to a combined form. A so-called hydrolyzed starch has been offered to the trade for use in cake and similar products for the purpose of overcoming the tendency to stale. This remedy is not satisfactory for various reasons known in the art, and except for protecting cake by water-proof wrappings and the like, which have no effect on preventing change in the form of the moisture, no other remedy has been seriously proposed.

The principal object of my invention is to improve the keeping quality of cake and similar bakery goods.

Another object is the provision of a process for the general improvement of cake products.

Another object is the provision of an improved cake product.

My invention consists generally in the addition to the cake batter, by a suitable process, a protective colloid which will have a tendency to keep the moisture colloidally bound, thus giving the cake much longer keeping qualities and improving the texture and grain generally. The colloidal substances which I prefer to use are in general, hydrophilic in character and when used in the cake become hydrated and have a tendency to retain the hydrated moisture for a relatively long period of time after the cake has been baked. I have found also that the heat imparted to the colloid during the process of baking causes it to become partially gelatinous so that it swells and has a tendency to keep more moisture colloidally bound than when originally introduced into the batter.

Among the hydrophilic colloids which I have found that can be used with the greatest success are gum tragacanth, gum acacia, citrous pectin, or pectin produced from other sources.

I have found that the most desirable results are obtained only when the colloidal substance is introduced in the proper manner so as to obtain a complete and substantially colloidal dispersion throughout the cake batter. This can be done in several ways providing the proper procedure is followed. I shall describe some of the methods of introduction as applied to gum tragacanth, which is representative of the class of substances which I have found available for use.

In preparing the gum for introduction into the batter it must be in such a form that it will readily imbibe moisture. If added into an aqueous medium in shredded form, the particles of gum on the surface imbibe moisture and prevent the moisture from entering the interior of the particles. If introduced directly into an aqueous medium in powdered form small particles of gum flocculate into larger bodies which absorb water on the outside and thus prevent the hydrating of each small particle. This results in the formation of lumps and a lumpy product is produced. This tendency is very noticeable in water and still more noticeable if the gum tragacanth is introduced directly into the batter.

I have discovered that in order to obtain a uniform formation of the gum particles I intermix with the powdered gum a substantially non-aqueous medium. This gives the hydrophilic colloid an opportunity to become uniformly distributed throughout the non-aqueous medium, separating one particle of gum from another, and thus preventing lumping and aggregating of the gum particles.

After the hydrophilic colloid has been distributed in the non-aqueous medium it is added to an aqueous medium for the purpose of absorbing moisture to effect the necessary hydration. It may in this way be dispersed in any constituent of the cake batter such, for example, as milk or water, or similar liquid with which the batter is mixed, or in egg products employed in certain types of cakes. I have found that in certain cases the hydrophilic colloid may be incorporated in a relatively large body of oleaginous material used for shortening or other purposes, and so incorporated directly into the batter of the cake, although in most instances I prefer to hydrate the hydrophilic colloid before introducing it into the batter. In connection with the dispersion of the hydrophilic colloid in egg materials, attention is directed to my prior Patent No. 1,737,365, in which the process for distributing the hydrophilic colloid in the egg material is described and claimed.

After the hydrophilic colloid has been suitably dispersed, preferably in a hydrated condition in a suitable medium, which medium can be employed in the production of the batter, the batter is produced by any of the ordinary methods well known in the art and the product baked in the usual manner.

As to the type of non-aqueous substance in which the hydrophilic colloid may be dispersed, this can vary greatly as long as the necessary separation of the individual particles of the hydrophilic colloid is obtained. Oil of various kinds, such as cottonseed oil or similar oils are suitable, glycerine can be used satisfactorily in many cases, or solid oleaginous substances are also advantageous under certain circumstances. In general, however, I prefer the liquid non-aqueous medium to the solid oleaginous type, particularly when the hydrophilic colloid is to be dispersed in water before being introduced into the cake batter.

I may also use finely divided crystalloid substances for the purpose of separating the particles of colloidal material, such as sodium chloride, powdered crystalloid carbohydrates such as milk sugar, sucrose, dextrose, or their equivalents. I may even distribute the hydrophilic colloid in prepared flour materials, and although satisfactory results are obtained by this method, it is not the one which I prefer to use, at least as at present developed.

When the colloid material is distributed in solid fats, I have found that I can employ such fats directly in the batter for shortening purposes, introducing the same into the batter in ways now customary in the baking industry. When used in this way the colloid substances are not primarily hydrated, but become hydrated after being introduced into the batter. The same condition exists where the hydrophilic colloid is dispersed in such materials as flour, the moisture being imbibed by the colloid material after the batter has been produced, or during the production thereof. The statement that further moisture is absorbed or fixed in the colloid by the heat of baking applies independent of how the colloid is introduced.

An example of the practice of the process of my invention with gum tragacanth employed in cake material is as follows: A batch of egg material is prepared which may be either yolks, whites, or whole eggs, either untreated or treated with substances for changing the viscosity characteristics thereof such as salt, acid, or the like. Gum tragacanth is then mixed with a vegetable oil such as cottonseed oil, in proportions of from one to three parts of gum tragacanth to from five to fifteen parts of the oil. The resulting mixture is then added to the eggs. Based upon use with fifty pounds of eggs, from a half to one pound of the mixture will lead to good results. The hydrophilic colloid absorbs moisture from the egg material and becomes hydrated. This is attended with a noticeable thickening of the egg material, thereby increasing its viscosity and emulsifying properties. When the hydration of the gum tragacanth has progressed to a satisfactory stage, the egg substances may be introduced into a cake batter in the usual way and with substantially the usual proportions. In actual practice I have found that the best results are obtained by first producing the egg substances with the hydrophilic colloid incorporated therein, the substance being produced some considerable length of time, and offered to the trade in the usual way and through the usual trade channels. This substance is offered to the bakers for use by them in the production of their batters as occasion requires.

If pectin is used, the dry powdered pectin may be mixed first with a non-aqueous substance such as glycerine and then introduced in suitable quantities into the milk or water or other aqueous substance used in the mixture of the cake batter. In the type of cakes where addition of oil to batter will adversely affect the volume of the cake such as certain types of sponge cakes, or cakes made with egg while sometimes known as angel food cakes, I disperse my colloid in a non-oleaginous substance, using a non-oleaginous separating medium such as glycerine.

If a powder such as sugar is used, for example, it may be used with a proportionately larger quantity of colloid material. For example, one part of finely powdered gum tragacanth may be intimately mixed with eight to ten parts of finely powdered sugar, and the mixture introduced into an aqueous substance with agitation or stirring to allow the gum to be uniformly dispersed. The aqueous substance used with gum tragacanth and sugar may very well be egg yolk material, as the sugar has an effect upon the viscosity characteristics of the egg yolk as well as serves to aid in dispersing the gum tragacanth.

The term cake employed in the present specification and in the claims is meant to include only cakes or similar products which are unleavened with yeast; that is to say, cakes that are leavened with baking powder or similar leavening agents such as the common types of cake known in the industries as pound cakes, baking powder cakes, sponge cakes, which are leavened by beating air into the batter and other types of cakes not leavened with yeast. The term "unleavened" as used in the claims, therefore, is used to mean unleavened with yeast.

It is obvious that my invention is not limited to the particular means herein described for securing the requisite dispersion of the hydrophilic colloid in the cake batter, and for obtaining the proper hydration thereof. Any suitable method by means of which the hydrophilic colloid may be thoroughly and intimately dispersed in the cake batter can be used without departing from my invention, which is defined in the appended claims.

What I claim as new and desire to protect by Letters Patent of the United States is:—

1. As a new article of manufacture, an unleavened baked cake product having uniformly distributed therein, a relatively small amount of a hydrated vegetable hydrophilic colloid capable of retaining moisture to prevent staling of the cake product.

2. As a new article of manufacture, an unleavened baked cake product having a relatively small amount of hydrated gum tragacanth uniformly distributed therein whereby staling is reduced.

3. As a new article of manufacture, an unleavened baked cake product having a relatively small amount of hydrated pectin uniformly distributed therein whereby staling is reduced.

4. As a new article of manufacture, an unleavened baked cake product having a relatively small amount of hydrated gum acacia uniformly distributed therein whereby staling is reduced.

5. As a new article of manufacture, an unleavened baked cake product having uniformly distributed therein a relatively small amount of a gum possessing colloidal properties said gum being hydrated whereby staling is reduced.

6. The method of producing an improved cake product, which includes dispersing a relatively small amount of a hydrophilic colloid in an aqueous liquid to hydrate the same, forming an unleavened cake batter from materials including said aqueous liquid and hydrophilic colloid, and baking the batter.

7. The method of producing an improved cake product which includes dispersing gum tragacanth in an aqueous medium to hydrate the same, mixing unleavened cake batter with ingredients including the aqueous medium and gum tragacanth, and baking the batter to produce the cake.

8. The method of producing an improved cake product which includes dispersing a relatively small amount of pectin in an aqueous medium to hydrate the same, mixing unleavened cake batter with ingredients including the aqueous medium and pectin, and baking the batter to produce the cake.

9. The method of producing an improved cake product which includes dispersing a relatively small amount of gum acacia in an aqueous medium to hydrate the same, mixing unleavened cake batter with ingredients including the aqueous medium and gum acacia, and baking the batter to produce the cake.

10. The method of making an improved unleavened cake which comprises dispersing in liquid egg material a relatively small proportion of a vegetable hydrophilic colloid capable of retaining moisture to prevent staling of the cake, and incorporating the resulting liquid egg product into a cake batter.

11. The method of making an improved unleavened cake which comprises dispersing in a liquid egg material, a relatively small amount of gum tragacanth, and incorporating the resulting liquid egg product into a cake batter.

ALBERT K. EPSTEIN.